United States Patent [19]

Narishige et al.

[11] Patent Number: 4,679,976

[45] Date of Patent: Jul. 14, 1987

[54] MANIPULATOR USABLE FOR A GLASS ELECTRODE OR THE LIKE

[75] Inventors: Eiichi Narishige; Shinji Yoneyama, both of Tokyo, Japan

[73] Assignees: Narishige Scientific Instrument Laboratory, Ltd.; Narishige Corporation Limited, both of Tokyo, Japan

[21] Appl. No.: 761,802

[22] Filed: Aug. 2, 1985

[30] Foreign Application Priority Data

May 17, 1985 [JP] Japan ........................ 60-105319

[51] Int. Cl.[4] ........................ B25J 13/02

[52] U.S. Cl. ........................ 414/4; 74/471 XY; 128/635

[58] Field of Search ........................ 414/4, 5; 901/16, 22; 74/471 XY; 128/303 B, 303.1, 635; 180/332, 333

[56] References Cited

U.S. PATENT DOCUMENTS

| | | | |
|---|---|---|---|
| 4,005,782 | 1/1977 | Crockett | 901/16 X |
| 4,397,336 | 8/1983 | Godfrey | 74/471 XY X |
| 4,526,169 | 7/1985 | Narishige et al. | 128/303 B |
| 4,604,016 | 8/1986 | Joyce | 414/5 X |
| 4,607,919 | 8/1986 | Gartner et al. | 74/471 XY X |
| 4,607,998 | 8/1986 | Hawkes | 414/4 X |

*Primary Examiner*—Frank E. Werner

*Assistant Examiner*—Donald W. Underwood

*Attorney, Agent, or Firm*—Cushman, Darby & Cushman

[57] ABSTRACT

An improved manipulator for manipulating a glass electrode or the like is disclosed. The manipulator includes a driving section and an actuating section with the glass electrode mounted thereon both of which are in operative association with one another by way of three lines of tubes. The X-coordinate, Y-coordinate and Z-coordinate driving mechanisms in the driving section are hydraulically communicated with the X-coordinate, Y-coordinate and Z-coordinate displacing mechanisms in the actuating section. As a tiltable lever with the Z-coordinate driving mechanism incorporated therein is inclined, hydraulic pressure in the X-Y coordinate plane driving mechanism constituted by the combination of X-coordinate and Y-coordinate rectilinear driving mechanisms varies and thus developed pressure variations are transmitted to the X-coordinate and Y-coordinate displacing mechanisms in the actuating section whereby the glass electrode is displaced by a distance equivalent to an angle of inclining movement of the tiltable lever in both the directions of X-coordinate and Y-coordinate. Displacing of the glass electrode in the direction of Z-coordinate is effected by rotating the knob on the tiltable lever. Water having a thermal expansion coefficient smaller than oil is used as hydraulic medium for each of the hydraulic cylinders.

5 Claims, 7 Drawing Figures

MANIPULATOR USABLE FOR A GLASS ELECTRODE OR THE LIKE

BACKGROUND OF THE INVENTION

1. Field of the Invention

The present invention relates to a manipulator usable for manipulating a glass electrode or the like and more particularly to a manipulator for remotely manipulating a glass electrode or the like with the aid of hydraulic pressure to take out genetic information concerning a certain cell in the field of fundamental medical science or biotechnology which has been progressively researched particularly relative to gene manipulation in recent years.

2. Description of the Prior Art

As is well known, a glass electrode is designed in recent years in the form of an injection needle-shaped glass tube of which diameter is in the range of 1 to 3 mm and of which length is in the range of 50 to 60 mm. A glass electrode thus designed is usually filled with an electrolyte such as potassium chloride, sodium chloride or the like. As a result of a variety of research and development works, such a glass electrode has been produced of which diameter at the foremost end is reduced in the order of 0.1 micron. Thus, it becomes possible to record a variety of pieces of genetic information concerning the functions of a certain single cell by inserting the glass electrode thereinto.

When a glass electrode of which foremost end diameter is reduced to 0.1 micron is inserted into a certain single cell, it is required that the electrode is properly positioned in order to inhibit both the cell and the electrode from being damaged or injured and that the displacing of the electrode is effected without any occurrence of shaking, meandering or the like.

In view of the above-mentioned requirements the inventor proposed a manipulator as disclosed in Japanese Patent Application Nos. 27478/1983 and 134918/1984. To facilitate understanding of the present invention it will be helpful that the manipulator as hitherto proposed by the inventor will be described below with reference to FIG. 7.

The conventional manipulator as illustrated in FIG. 7 is operated by hydraulic oil. When the X-coordinate rectilinear driving mechanism 81 is actuated, a glass electrode A or the like mounted on the actuating section 82 is displaced in the longitudinal direction (hereinafter referred to as direction of X-coordinate). When the Y-coordinate linear driving mechanism 83 is actuated, it is displaced in the transverse direction (hereinafter referred to as direction of Y-coordinate). Further, when the tiltable lever 85 is rotated to actuate the Z-coordinate driving mechanism 84, it is displaced in the vertical direction (hereinafter referred to as direction of Z-coordinate). Moreover, when the tiltable lever 85 is inclined in any direction, it is displaced by means of the X-Y coordinate plane driving mechanism 86 by a distance corresponding to the direction of inclining movement of the tiltable lever as well as the amount of inclining movement of the same.

As is apparent from the drawing, the manipulator of the prior invention is so constructed that both the X-coordinate and Y-coordinate rectilinear driving mechanisms 81 and 83 are arranged separately from the X-Y coordinate plane driving mechanism 86 and each of them is in hydraulic communication with the actuating section 82 by way of a line of tube. Due to arrangement of the driving mechanisms made in that way it results that the manipulator is constructed by a large number of parts and components in larger dimensions, causing it to be manufactured at an increased cost. Specifically, each of the X-coordinate rectilinear driving mechanism 81 and the Y-coordinate rectilinear driving mechanism 83 has a hydraulic cylinder incorporated therein. On the other hand, the X-Y coordinate plane driving mechanism 86 also has a hydraulic cylinder 87 operable in the direction of X-coordinate and a hydraulic cylinder 88 operable in the direction of Y-coordinate incorporated therein. This structure necessitates a large number of accessories such as brackets, etc. The hydraulic cylinder 87 operable in the direction of X-coordinate is in hydraulic communication not only with an associated hydraulic cylinder in the actuating section 82 but also with a hydraulic cylinder of the X-coordinate rectilinear displacing mechanism 81, whereas the hydraulic cylinder 88 operable in the direction of Y-coordinate is in hydraulic communication with both an associated hydraulic cylinder in the actuating section 82 and a hydraulic cylinder of the Y-coordinate rectilinear driving mechanism 83 in the same manner as the hydraulic cylinder 87. This means that the entire hydraulic system has many junctions and thereby assembling is achieved only with a number of manhours. The other drawback of the conventional manipulator is that air bubbles tend to remain attached to the junction areas during the operation of oil filling and it is rather hard to vent the air. Moreover, a considerably large volume of oil is required in the hydraulic system. Another drawback of the conventional manipulator is that when the X-coordinate rectilinear driving mechanism 81 or the Y-coordinate rectilinear driving mechanism 83 is actuated, hydraulic pressure is transmitted not only to the actuating section 82 but also to the X-Y coordinate plane driving mechanism 86 whereby a hydraulic pressure active on the actuating section 82 is reduced and moreover the X-Y coordinate plane driving mechanism is caused to operate as the actuating section 82 is actuated whereby a part of the hydraulic pressure in the actuating section is absorbed by the hydraulic cylinders in the X-Y coordinate plane driving mechanism, resulting in a glass electrode or the like being displaced away from the required position.

Due to the use of oil as a hydraulic medium in the conventional manipulator, the thermal expansion of the oil with the rise in temperature causes the glass electrode or the like to be deviated from the required position. For the reason it is preferable that hydraulic medium having a low thermal expansion coefficient is employed for the hydraulic system but the inventor has failed to obtain a hydraulic medium suitable for the manipulator. It was proposed that water be used as a hydraulic medium but employment of water was abandoned because there was a fear of causing rust due to leaked water.

Further, the actuating section of the conventional manipulator is so constructed that a large diaphragm is incorporated therein and a return spring is positioned on the lateral side thereof, resulting in the entire actuating section being designed in larger dimensions. For the reason there has been a great demand for an actuating section of smaller size among the users.

SUMMARY OF THE INVENTION

Hence, the present invention has been made with the foregoing background in mind.

It is an object of the present invention to provide a manipulator of the early mentioned type which assures that it is constructed by means of the reduced number of parts and components in smaller dimensions.

It is other object of the present invention to provide a manipulator of the early mentioned type which assures that a glass electrode or the like is positioned with a high accuracy.

It is another object of the present invention to provide a manipulator of the early mentioned type which has no possibility of causing such a malfunction that the glass electrode or the like is deviated from the predetermined position.

To accomplish the above objects there is proposed according to the present invention a manipulator for manipulating a glass electrode or the like essentially comprising an actuating section with the glass electrode or the like mounted thereon, the actuating section including an X-coordinate displacing mechanism for displacing it in the direction of X-coordinate, a Y coordinate displacing mechanism for displacing it in the direction of Y-coordinate and a Z-coordinate displacing mechanism for displacing it in the direction of Z-coordinate, each of the X-coordinate, Y-coordinate and Z-coordinate displacing mechanisms including a hydraulic cylinder which is filled with a hydraulic medium, and a driving section for driving the actuating section, the driving section including an X-Y coordinate plane driving mechanism and a Z-coordinate driving mechanism, the X-Y coordinate plane driving mechanism comprising an X-coordinate rectilinear driving mechanism and a Y-coordinate rectilinear driving mechanism and being adapted to be actuated by means of a tiltable lever in which the Z-coordinate driving mechanism is incorporated, each of the X-coordinate, Y-coordinate and Z-coordinate driving mechanisms including a hydraulic cylinder which is filled with hydraulic medium, wherein the hydraulic cylinder of the X-coordinate rectilinear driving mechanism in the driving section is in hydraulic communication with the hydraulic cylinder of the X-coordinate displacing mechanism in the actuating section by way of a tube, the hydraulic cylinder of the Y-coordinate rectilinear driving mechanism in the driving section is in hydraulic communication with the hydraulic cylinder of the Y-coordinate displacing mechanism in the actuating section by way of a tube and the hydraulic cylinder of the Z-coordinate driving mechanism in the driving section is in hydraulic communication with the hydraulic cylinder of the Z-coordinate displacing mechanism in the actuating section by way of a tube.

In a preferred embodiment of the invention the tiltable lever with the Z-coordinate driving mechanism incorporated therein is operatively associated with the X-Y coordinate driving mechanism by way of the combination of a ball on the top end of a support shaft standing upright on a sliding board of the X-coordinate rectilinear driving mechanism and a larger ball fixedly secured to the lowermost end of the tiltable lever. The larger ball is provided with a through hole in which the ball on the support shaft is inserted.

To adjust an extent of actuation of the tiltable lever the larger ball is rotatably supported on a case of the driving section in such a manner its position in the ball receiving hole can be adjusted by means of the combination of an adjusting ring and a retaining ring.

Each of the hydraulic cylinders in both the driving and actuating sections is filled with water having a thermal expansion coefficient smaller than that of hydraulic oil.

Each of the hydraulic cylinders in the actuating section is provided with a very small diaphragm and each of the displacing mechanisms in the actuating section includes a base board to which the hydraulic cylinder is fixedly secured, a slider adapted to slidably move on the base board, a piston rod fixedly secured to the one end of the slider, the foremost end of the piston rod coming in contact with the diaphragm, and a return spring inserted into an elongated hole which is formed through the slider to the foremost end of the piston rod.

Other objects, features and advantages of the invention will become more clearly apparent from reading the following description which has been prepared in conjunction with the accompanying drawings.

BRIEF DESCRIPTION OF THE DRAWINGS

The accompanying drawings will be briefly described below.

FIG. 7 is a schematic perspective view of a conventional manipulator usable for manipulating a glass electrode or the like.

DESCRIPTION OF THE PREFERRED EMBODIMENT

Now, the present invention will be described in a greater detail hereunder with reference to the accompanying drawings which illustrate an embodiment of the invention.

Figure 1:
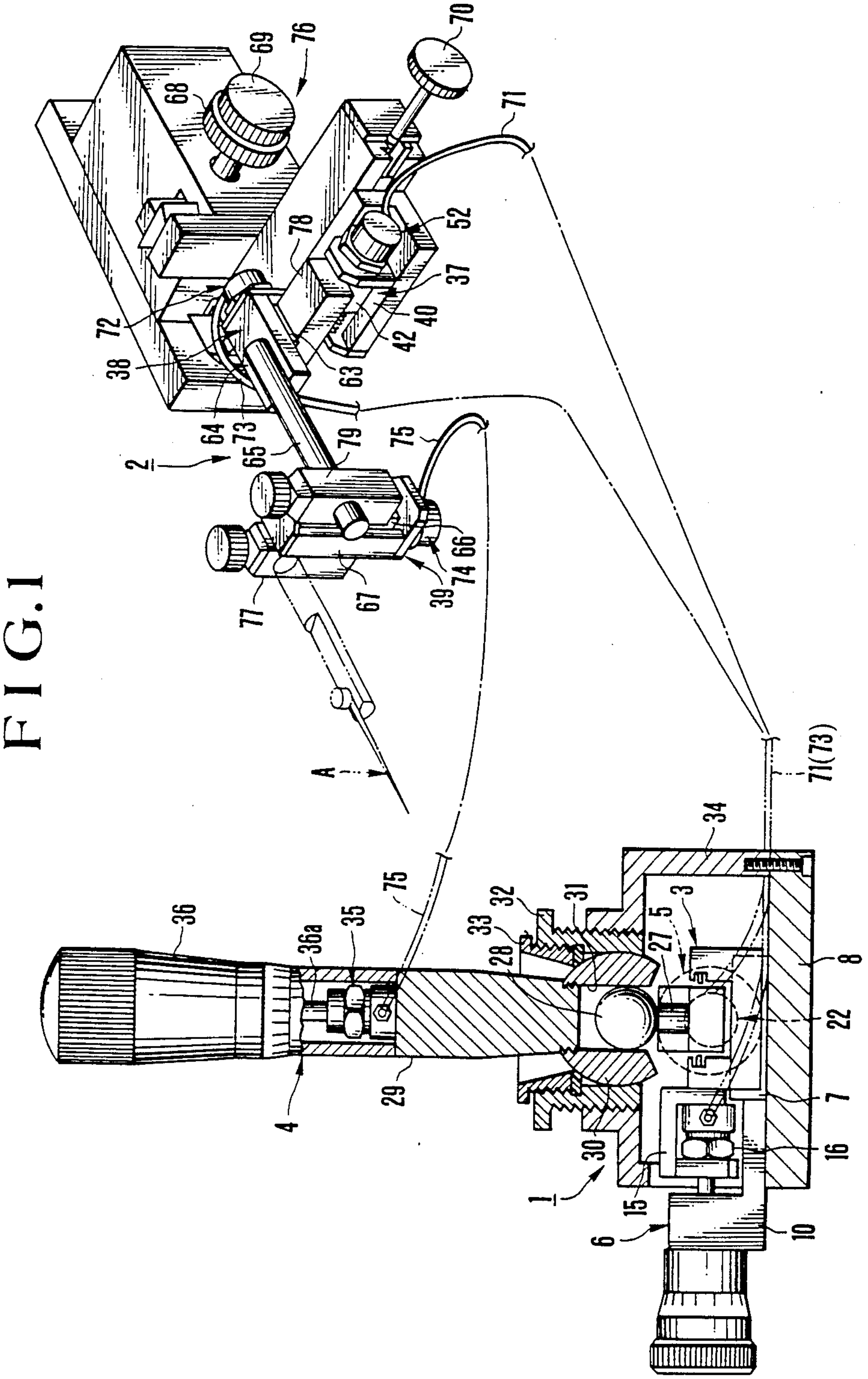
FIG. 1 illustrates a manipulator in accordance with an embodiment of the invention, wherein the left part of the drawing is a vertical sectional view of the driving section and the right part of the same is a perspective view of the actuating section.
Figure 2:
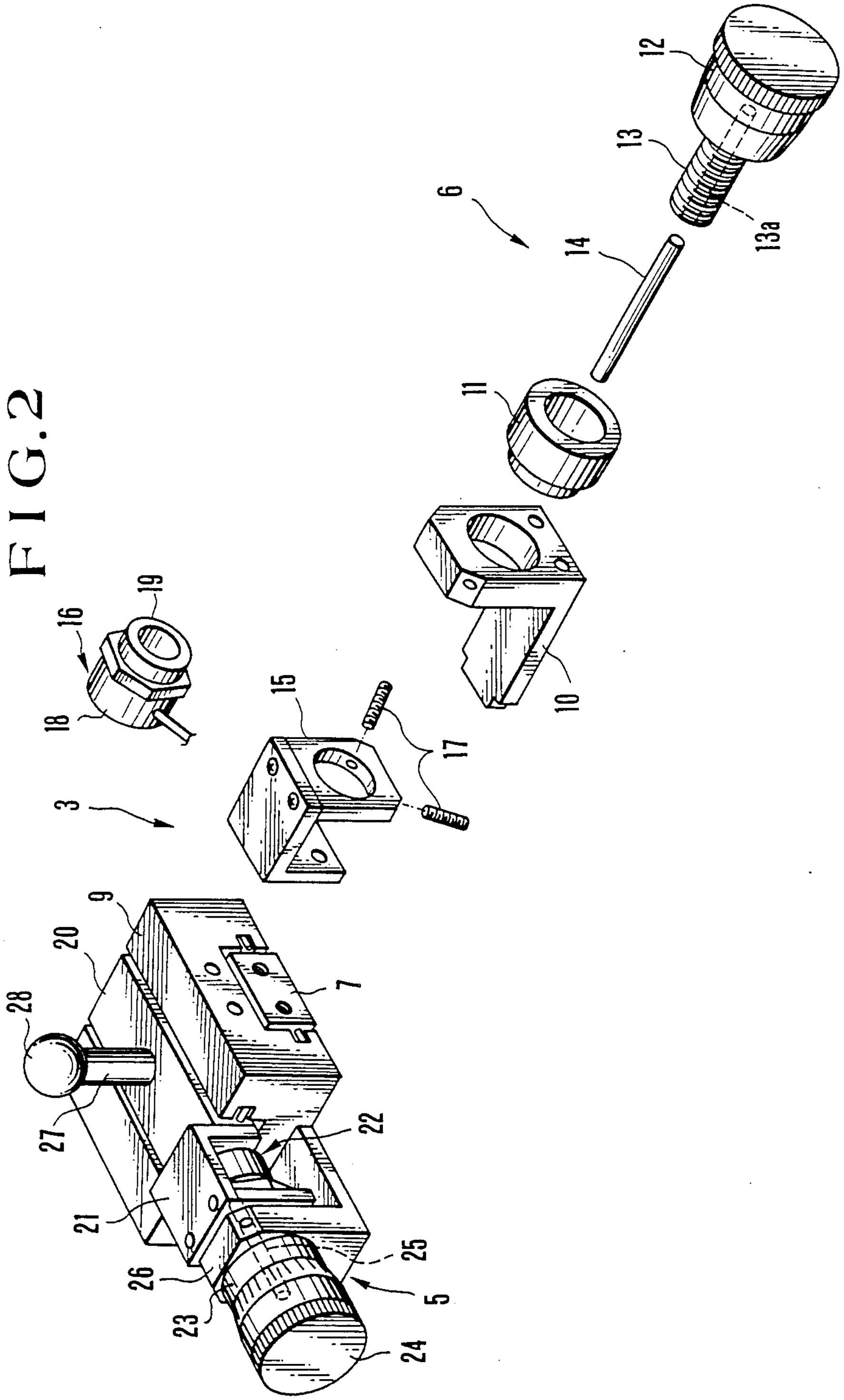
FIG. 2 is a perspective view of the X-Y coordinate plane driving mechanism, shown in the disassembled state.

In FIG. 1 reference numeral 1 designates a driving section and reference numeral 2 designates an actuating section. Specifically, the driving section 1 is constituted by a combination of X-Y coordinate plane driving mechanism 3, Z coordinate driving mechanism 4, X-coordinate rectilinear driving mechanism 5 and Y-coordinate rectilinear driving mechanism 6. As illustrated in FIGS. 1 and 2, the X-Y coordinate plane driving mechanism 3 is so constructed that a stationary board 7 is fixedly mounted on a base platform 8 by means of a plurality of screws and Y-coordinate sliding board 9 is slidably mounted on the stationary board 7 so as to slide in the transverse direction, that is, in the direction of Y-coordinate. A L-shaped bracket 10 is fastened to the one end face of the stationary board 7 by means of screws and a body 11 of the Y-coordinate rectilinear driving mechanism 6 is attached to the blacket 10 by means of screws. The screw shaft 13 of a knob 12 is threadably engaged with the body 11 of the Y-coordinate rectilinear driving mechanism 6 and has an elongated hole 13*a* formed therein into which the one end of a piston rod 14 is inserted.

On the other hand, a bracket 15 having the inverted U-shaped sectional configuration is fastened to a Y-coordinate sliding board 9 in operative association with the Y-coordinate rectilinear driving mechanism 6 by means of screws and a hydraulic cylinder 16 is fitted to the bracket 15 by means of screws 17. As will be described in more details later, the hydraulic cylinder 16 essentially comprises a casing 18 with a hydraulic chamber formed therein, a diaphragm and a tubular member 19 which serves to attach the diaphragm to the casing 18 and moreover fixedly secure it to the bracket 15. An X-coordinate sliding board 20 is slidably mounted on the Y-coordinate sliding board 9 to carry out sliding movement relative to the Y-coordinate sliding board 9. The sliding direction of the X-coordinate sliding board 20 is in the horizontal direction, that is, in the X-coordinate direction. This means that it crosses at a right angle with the sliding direction of the Y-coordinate sliding board 9 which slides on the stationary board 7.

As will be best seen in FIG. 2, a bracket 21 is fastened to the one end face of the X-coordinate sliding board 20 by means of screws in the same manner as in the case of Y-coordinate sliding board 9 and a hydraulic cylinder 22 is fixedly secured to the bracket 21 by means of screws. The X-coordinate rectilinear driving mechanism 5 is attached to the one end face of the Y-coordinate sliding board 9 in operative association with the hydraulic cylinder 22. The X-coordinate rectilinear driving mechanism 5 essentially comprises a housing 23, a knob 24 threadably engaged with the housing 23 and a piston rod 25 of which one end is inserted into an elongated hole which is formed in the knob 24 in the same manner as in the case of the Y-coordinate rectilinear driving mechanism 6. The housing 23 of the X-coordinate rectilinear driving mechanism 5 is fixedly secured to the bracket 23 by means of screws. It should of course be understood that the bracket 26 is attached to the Y-coordinate sliding board 9 by means of screws. A ball 28 is fixedly secured to the top end of a support shaft 27 which stands upright on the upper surface of the X-coordinate sliding board 20. The ball 28 is fitted into a receiving hole 31 of a larger ball 30 which is fixedly connected to a tiltable lever 29. The larger ball 30 is rotatably supported with the aid of a combination of adjusting ring 32 and retaining ring 33. The adjusting ring 32 is threadably engaged with a case 34. The rotation of the adjusting ring 32 relative to the housing 34 causes the distance between the centers of the ball 28 and the larger ball 30 to change. The center of the larger ball 30 is the fulcrum of the tiltable lever 29. Therefore the increase or decrease in the distance between the centers allows the quantity of the displacement of the ball 28 caused by the inclination of the tiltable lever 29 to be increased or decreased. Thus increased or decreased quantity of the displacement, in turn, is transmitted to the X-coordinate sliding board 20 or the Y-coordinate sliding board 9, resulting in adjustment of the quantity of the displacement of the glass electrode A attached to the actuation section 2 as required by the operator. The tiltable lever 29 is provided with the Z-coordinate driving machanism 4 which consists of the hydraulic cylinder 35 similar to the hydraulic cylinder as stated above, the piston rod 36*a* whereby to thrust the diaphragm of the hydraulic cylinder 35 and a knob threadably engaged with the tiltable lever 29. As will be described later, the hydraulic cylinders 16, 22 and 35 are in communication with their associated hydraulic cylinders mounted on the actuating section 2 by way of three lines of tubes.

The actuating section 2 includes an X-coordinate displacing mechanism 37, a Y-coordinate displacing mechanism 38 and a Z-coordinate displacing mechanism 39 each of which is constructed in the same structure differing in that they are mounted on the actuating section 2 in the different orientation so as to assure displacing in the different direction. Namely, the X-coordinate displacing mechanism 37 is so mounted that displacing is achieved in the direction of X-coordinate. The Y-coordinate displacing mechanism 38 is so mounted that displacing is achieved in the direction of Y-coordinate. The Z-coordinate displacing mechanism 39 is so mounted that displacing is achieved in the direction of height. In view of the above-mentioned fact description will be made below only with respect to the X-coordinate displacing mechanism 37 for the purpose of simplification.

Figure 3:
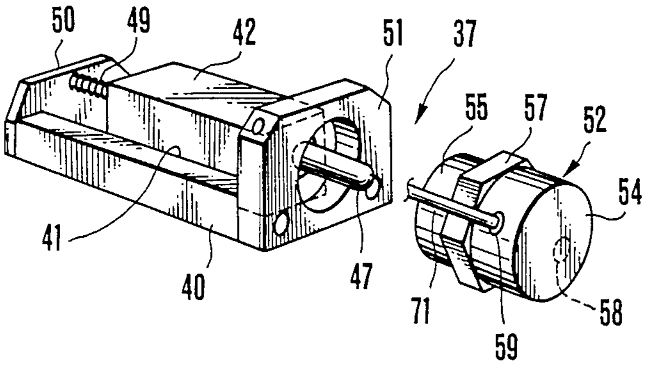
FIG. 3 is a perspective view of the X-coordinate displacing mechanism, shown in the disassembled state.
Figure 4:
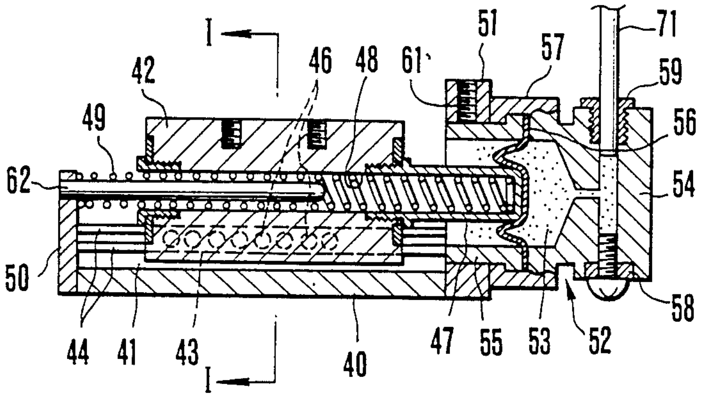
FIG. 4 is a vertical sectional view of the X-coordinate displacing mechanism in FIG. 3.
Figure 6:
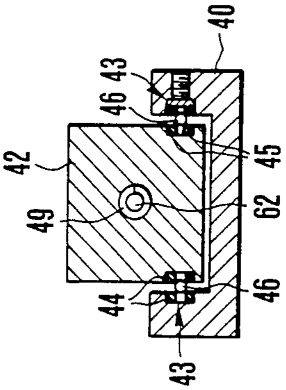
FIG. 6 is a cross-sectional view of the X-coordinate displacing mechanism taken in line I—I in FIG. 4.
Figure 5:
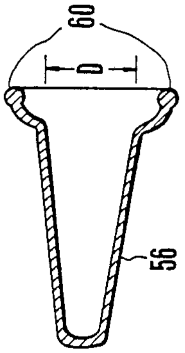
FIG. 5 is a sectional view of a diaphragm which is incorporated in the X-coordinate displacing mechanism in FIG. 4.
Figure 7:
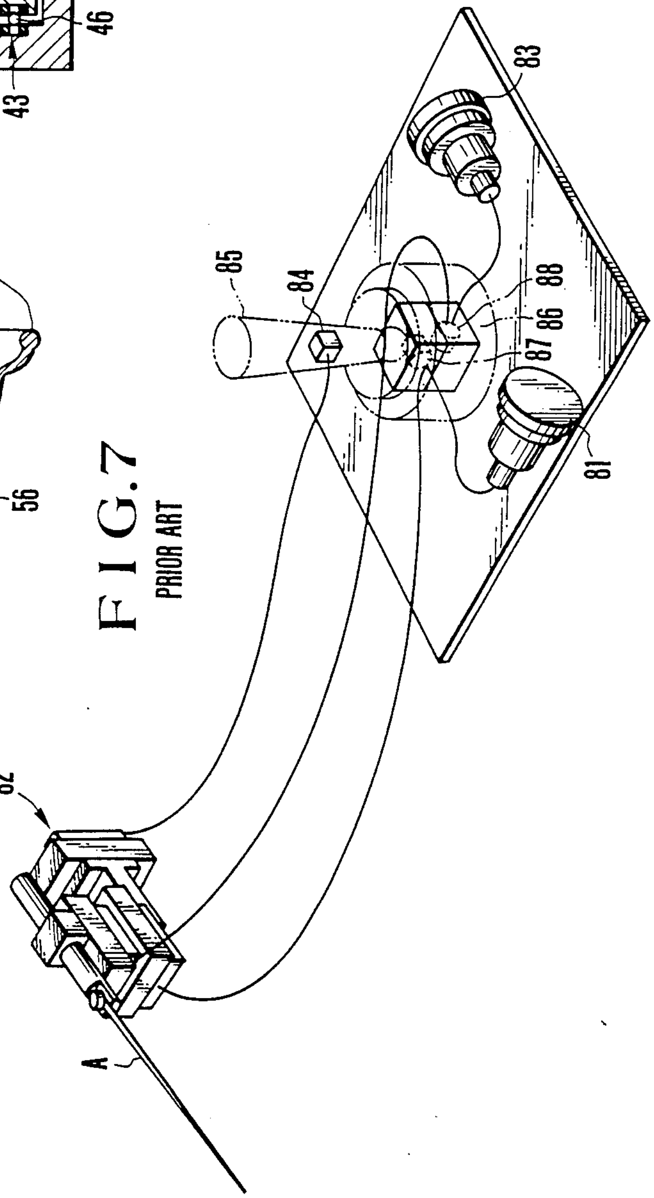
FIG.7 PRIOR ART

As illustrated in FIGS. 3 to 5, the X-coordinate displacing mechanism 37 includes a base board 40 having the U-shaped cross-sectional configuration and a slider 42 is slidably disposed within a groove 41 of the base board 40 with the aid of a plurality of bearings 43. As is apparent from FIG. 6, the bearings 43 are so constructed that a number of steel balls 46 are interposed between two rails 44 and 45 in the form of square wire which are fitted into grooves formed on both the side walls of the base board 40 as well as the slider 42. A piston rod 47 is fixedly secured to the one end face of the slider 42 at the central part of the latter and an elongated hole 48 is drilled in the area extending from the other end of the slider 42 to the foremost end of the piston rod 47 so that a return spring 49 is inserted through the hole 49 so as to allow it to be spanned between the end plate 50 of the base board 40 and the foremost end of the piston rod 47. It should be noted that the length of the return spring 49 is made as long as possible in order that its tension coefficient is adversely affected during expansion and compression. A bracket 51 is fastened to the fore end face of the base board 40 as seen in the drawing by means of screws and moreover a hydraulic cylinder 52 as constructed in the same manner as the hydraulic cylinders 16, 22 and 35 is attached to the bracket 51 by means of screws. As illustrated in FIG. 4, the hydraulic cylinder 52 is so constructed that the flange portion of a diaphragm 56 is clamped between a casing 54 having a hydraulic chamber 53 formed therein and a tubular member 55 and both the casing 54 and the tubular member 55 are immovably connected to one another by means of a threaded ring 57. The casing 54 is provided with a valve 58 for introducing hydraulic fluids into the hydraulic chamber 53 or for venting air from the latter and a joint 59 by way of which hydraulic communication is established between the hydraulic cylinder 52 and the hydraulic cylinder 22 in the driving section 1. The diaphragm 56 is made of rubber lined with net material and the diaphragm is very small in diameter, for instance, less than 5 mm. To assure reliable sealing the flange portion of the diaphragm 56 is integrally formed with a ring-shaped projection 60. The tubular member 55 is fixedly attached to the bracket 51 by means of screws 61. Further, to inhibit the return spring 49 from being deflected away from the axis of the elongated hole 48 a rod 62 projected from the end plate 50 is inserted into the return spring 49.

The slider 42 of the X-coordinate displacing mechanism 37 is fixedly secured to the slider 63 of the Y-coordinate displacing mechanism 38 and moreover the base board 64 of the Y-coordinate displacing mechanism 38 is connected to the slider 66 of the Z-coordinate displacing mechanism 39 by way of a rod 65. It should of course be understood that the glass electrode A is mounted on the Z-coordinate displacing mechanism 39 in such a manner that it can be freely displaced in any one of the three directions, that is, the directions of X-coordinate, Y-coordinate and Z-coordinate by means of the combination of X-coordinate displacing mechanism 37, Y-coordinate displacing mechanism 38 and Z-coordinate displacing mechanism 39. As is apparent from the right part of FIG. 1, the glass electrode A is mounted on the base board 67 of the Z-coordinate displacing mechanism 39 with the aid of a fitting tool 77. Preferably, securing of the X-coordinate displacing mechanism 37 to the Y-coordinate displacing mechanism 38 and securing of the latter to the Z-coordinate displacing mechanism 39 are achieved by using auxiliary member such as plate-shaped fitting members 78 and 79 or the like. The base board 40 of the X-coordinate displacing mechanism 37 includes actuating knobs 68 to 70 which constitute components for a manual displacing mechanism 76 for carrying out manual displacing in the X-coordinate, Y-coordinate and Z-coordinate directions. Thus, the actuating section 2 can be mounted on a certain scientific device such as a microscope or the like with the aid of the manual displacing mechanism 76. Obviously, the base board 40 of the X-coordinate displacing mechanism 37 can be mounted directly on such scientific equipment. Since each of the X-coordinate displacing mechanism 37, the Y-coordinate displacing mechanism 38 and the Z-coordinate displacing mechanism 39 is designed in very small dimensions, they can be easily assembled on the manual displacing mechanism 76. It should be noted that the manner of assembling on the latter should not be limited only to that as illustrated in FIG. 1 but any other manner or type of assembling may be employed, provided that the intended purpose is satisfactorily accomplished thereby.

As illustrated in FIG. 1, the hydraulic cylinder 52 of the X-coordinate displacing mechanism 37 is in hydraulic communication with the hydraulic cylinder 22 in the driving section 1 by way of a tube 71, the hydraulic cylinder 72 of the Y-coordinate displacing mechanism 38 is in hydraulic communication with the hydraulic cylinder 16 in the driving section 1 by way of a tube 73 and the hydraulic cylinder 74 of the Z-coordinate displacing mechanism 39 is in hydraulic communication with the hydraulic cylinder 35 in the driving section 1 by way of a tube 75. Each of the hydraulic cylinders 16, 22, 35, 52, 72 and 74 is watertightly filled with water having a small thermal expansion coefficient at a predetermined pressure.

Next, operation of the manipulator of the invention will be described below.

When the glass electrode A is to be displaced to a certain required position in a cell, displacing is achieved by means of the manual displacing mechanism 76 or the combination of X-coordinate rectilinear driving mechanism 5, Y-coordinate linear driving mechanism 6 and Z-coordinate driving mechanism 4. On the other hand, when a cell is to be processed or genetic information is to be obtained therefrom, the X-Y coordinate plane driving mechanism 3 and the Z-coordinate driving mechanism 4 are actuated to displace the glass electrode A. At this moment the X-coordinate rectilinear driving mechanism 5 and the Y-coordinate rectilinear driving mechanism 6 may be actuated additionally.

As the knob 24 of the X-coordinate rectilinear displacing mechanism 5 is rotated, the piston rod 25 is caused to thrust the diaphragm in the hydraulic cylinder 22 to increase hydraulic pressure or move away from the diaphragm to reduce hydraulic pressure. This causes thus developed variations of working forces of the hydraulic cylinder 22 to be transmitted to the hydraulic cylinder 52 in the X-coordinate displacing mechanism 37 of the actuating section 2 whereby thrusting force exerted on the diaphragm 56 of the hydraulic cylinder 52 by means of the piston rod 47 varies. As a result, the slider 42 slides on the base board 40 by a distance equivalent to an extent of rotation of the knob 24. Things are the same with respect to the Y-coordinate rectilinear driving mechanism 6 and the Z-coordinate driving mechanism 4. The Y-coordinate displacing mechanism 38 and the Z-coordinate displacing mechanism 39 in the actuating section 2 are actuated corresponding to an extent of rotation of the knobs of the Y-coordinate rectilinear driving mechanism 6 and the Z-coordinate driving mechanism 4 in the driving section 1.

When the tiltable lever 29 is inclined, the X-Y coordinate plane driving mechanism 3 is actuated in dependence on the direction of tilting movement and an extent of the same. Specifically, the Y-coordinate sliding board 9 slides on the stationary board 7 and then the X-coordinate sliding board 20 slides on the Y-coordinate sliding board 9 in dependence on the direction of tilting movement of the tilting lever 29 and an extent of the same. In response to sliding movement as mentioned above thrusting force of the hydraulic cylinders 16 and 22 varies and variation of thrusting force is transmitted to the hydraulic cylinder 72 of the Y-coordinate displacing mechanism 38 and the hydraulic cylinder 52 of the X-coordinate displacing mechanism 37 whereby the glass electrode A is displaced in the same manner as mentioned above. When thrusting force of the hydraulic cylinders 52, 72 and 74 in the actuating section 2 is reduced, displacing is effected at a high responsive speed by the effect of resilient force of the return spring 49.

In the above-described embodiment the employment of water as a hydraulic medium which has a smaller thermal expansion coefficient than oil causes the positional fluctuations of the glass electrode A with the variations in temperature—so called "drift due to heat'"—to be minimized. The drift can be reduced to one sixth of that of oil. In addition, the reduction in the internal volume of the hydraulic system itself has the drift reduced further to one tenth in comparison with the conventional manipulators in which oil is employed as a hydraulic medium.

The other characteristic feature of the manipulator of the invention lies in its compactness. The X-coordinate displacing mechanism 37 is so designed that it is provided with a very small diaphragm 56 which is smaller than 5 mm in diameter, a hole 48 which extends as far as to the foremost end of the piston rod 47 in the middle of a slider 42 and a return spring 49 accommodated in the elongated hole 48. All these parts are compactly assembled into the X-coordinate displacing mechanism 37. The Y-coordinate displacing mechanism 38 and the Z-coordinate displacing mechanism 39 have a similar construction to the X-coordinate displacing mechanism 37. The actuating section 2 which is an assembly of these three compact displacing mechanisms is very small in its entire construction. Accordingly, the actuating section 2 can be mounted on any required position located over the stage of a microscope which usually has a narrow space. As a result, a distance as measured from the fitting tool 77 to the foremost end of the glass electrode A can be shortened substantially, compared with the conventional manipulator. Thus, undesirable deflection of the glass electrode A caused due to vibration can be reduced and thereby any processing operation can be smoothly performed by an operator. Moreover, many manipulators can be mounted at the positions located over a microscope. The X-coordinate displacing mechanism 37, the Y-coordinate displacing mechanism 38 and the Z-coordinate displacing mechanism 39 are all so small in size that the actuating section 2 can also be reduced in size. Therefore it is easy to mount the actuating section 2 on the adapter by means of which the actuating section 2 can be fitted to a microscope.

Since each of the hydraulic cylinders 16, 22, 35, 52, 72 and 74 is designed and constructed in the same structure in such a manner that it is fixedly attached to a bracket such as the brackets 15, 21 and 51 by means of a plurality of screws, it can be easily replaced with other new one when it fails to function properly and moreover it can commonly be used at any position without any necessity for selective operation. Thus, replacement operation can be performed for a short period of time as required, provided that two hydraulic cylinders are hydraulically connected to one another by way of a tube and pressure test and leakage test are previously performed for the predetermined period of time after they are filled with water.

As will be readily understood from the above description, the manipulator of the invention usable for manipulating a glass electrode or the like has the following advantageous features. One of them is that the combination of X-coordinate rectilinear driving mechanism and Y-coordinate rectilinear driving mechanism serves also as an X-Y coordinate plane driving mechanism without occurrence of such a malfunction that when the X-coordinate rectilinear driving mechanism or the Y-coordinate rectilinear driving mechanism is actuated, a part of thus generated hydraulic pressure is absorbed by an associated hydraulic cylinder of the X-Y coordinate plane driving mechanism as is seen with the conventional manipulator. As a result, the manipulator of the invention can be constituted by the reduced number of parts and components. Other one is that displacing of a glass electrode or the like can be achieved with an improved accuracy while inhibiting an occurrence of incorrect processing. Another one is that the manipulator of the invention can be manufactured in smaller dimensions at an inexpensive cost.

While the present invention has been described above with respect to a preferred embodiment, it should of course be understood that it should not be limited only to this but various changes or modifications may be made in any acceptable manner without departure from the spirit and scope of the invention.

What is claimed is:

1. A manipulator for manipulating a glass electrode comprising:

an actuating section having the glass electrode mounted thereon, said actuating section including an X-coordinate displacing means for displacing said electrode in an X-coordinate direction, a Y-coordinate displacing means for displacing said electrode in a Y-coordinate direction, and a Z-coordinate displacing means for displacing said electrode in a Z-coordinate direction, each of said X-coordinate, Y-coordinate and Z-coordinate displacing means including a hydraulic cylinder filled with a hydraulic medium; and a driving section for driving said actuating section, said driving section including a X-Y coordinate plane driving means, said X-Y coordinate plane driving means comprising an X-coordinate rectilinear driving means and a Y-coordinate rectilinear driving means and a tiltable lever including a Z-coordinate driving means and operatively coupled to said X-Y coordinate plane driving means, each of said X-coordinate, Y-coordinate and Z-coordinate driving means including a hydraulic cylinder filled with a hydraulic medium, the hydraulic cylinder of the X-coordinate rectilinear driving means being in hydraulic communication with the hydraulic cylinder of the X-coordinate displacing means, the hydraulic cylinder of the Y-coordinate rectilinear driving means being in hydraulic communication with the hydraulic cylinder of the Y-coordinate displacing means and the hydraulic cylinder of the Z-coordinate driving means being in hydraulic communication with the hydraulic cylinder of the Z-coordinate displacing means;

each said hydraulic cylinder of said displacing means including a very small diaphragm; and each of the displacing means including a baseboard to which a respective hydraulic cylinder is fixedly secured; a slider slidably mounted on said baseboard, said slider including a piston rod means which extends towards said respective hydraulic cylinder, a forwardmost end of said piston rod means operatively engaging the diaphragm of said respective hydraulic cylinder; an end plate member mounted to said baseboard adjacent a rearward end of said slider; and a return spring means extending from said end plate member into an elongated hole defined in said slider for urging said piston rod means into engagement with said diaphragm.

2. A manipulator as defined in claim 1, wherein the hydraulic medium of each of the hydraulic cylinders in the driving and actuating sections is water.

3. A manipulator as defined in claim 1, wherein each said hydraulic cylinder of said X-coordinate, Y-coordinate and Z-coordinate drive means is detachably mounted to said driving section and each said hydraulic cylinder of said X-coordinate, Y-coordinate and Z-coordinate displacing means is detachably mounted to said actuating section.

4. A manipulator as defined in claim 1, wherein the tiltable lever with the Z-coordinate driving means incorporated therein is operatively coupled to the X-Y coordinate plane driving means by means of a ball disposed on an upper end of a support shaft mounted upright on a sliding board of the X-coordinate rectilinear driving means and a larger ball fixedly secured to a lowermost end of the tiltable lever, said larger ball being provided with a ball receiving hole in which the ball on the support shaft is disposed.

5. A manipulator as defined in claim 4, wherein the larger ball of the tiltable lever is rotatably mounted to a case of the driving section and operatively coupled to an adjusting ring and a retaining ring for vertical adjustment of said larger ball relative to said case.

* * * * *